United States Patent [19]

Palmer

[11] 4,274,966
[45] Jun. 23, 1981

[54] METHOD AND DEVICE FOR PURIFYING SEWAGE

[76] Inventor: Willy F. Palmer, Von Vollmerstrasse 33, D 8160 Miesbach, Fed. Rep. of Germany

[21] Appl. No.: 63,562

[22] PCT Filed: May 17, 1979

[86] PCT No.: PCT/DE78/00023
§ 371 Date: May 17, 1979
§ 102(e) Date: May 17, 1979

[87] PCT Pub. No.: WO79/00128
PCT Pub. Date: Mar. 22, 1979

[51] Int. Cl.³ .............................................. C02F 3/10
[52] U.S. Cl. .................................... 210/618; 210/631; 210/763; 210/150
[58] Field of Search .................... 210/4, 11, 7, 15, 17, 210/18, 32, 39, 40, 150, 151, 275, 615, 616, 617, 618, 620, 631, 763

[56] References Cited

U.S. PATENT DOCUMENTS

| Re. 24,219 | 9/1956 | Pirnie | 210/15 |
|---|---|---|---|
| Re. 27,721 | 8/1973 | Klock | 210/150 |
| 326,221 | 9/1885 | Hyatt | 210/151 |
| 977,965 | 12/1910 | Paul | 210/150 |
| 2,352,901 | 7/1944 | Klein | 210/151 |
| 3,072,492 | 7/1962 | Gambrel | 210/15 |
| 3,218,252 | 11/1965 | Glover | 210/4 |
| 3,293,174 | 12/1960 | Robjohns | 210/150 |
| 3,356,609 | 12/1967 | Breunner | 210/11 |
| 3,625,886 | 12/1971 | Mattia | 210/32 |
| 3,649,532 | 3/1972 | McLean | 210/151 |
| 3,773,660 | 11/1973 | Hopwood | 210/17 |
| 3,855,120 | 12/1974 | Garbo | 210/17 |
| 3,928,191 | 12/1975 | Belasco | 210/15 |
| 3,933,629 | 1/1976 | Smith | 210/150 |
| 3,956,128 | 5/1976 | Turner | 210/150 |
| 3,960,717 | 6/1976 | Wyatt | 210/15 |
| 4,053,396 | 10/1977 | Trense | 210/32 |
| 4,126,544 | 11/1978 | Baensch | 210/17 |
| 4,141,823 | 2/1979 | Smith | 210/17 |
| 4,167,479 | 9/1979 | Besik | 210/17 |
| 4,192,742 | 3/1980 | Bernard | 210/17 |

FOREIGN PATENT DOCUMENTS

| 241909 | 4/1946 | Belgium . |
| 2315615 | 10/1974 | Fed. Rep. of Germany . |
| 2316491 | 10/1974 | Fed. Rep. of Germany . |
| 2739690 | 3/1979 | Fed. Rep. of Germany . |
| 2145887 | 2/1973 | France . |
| 2190744 | 6/1973 | France . |
| 191576 | 9/1937 | Switzerland . |

Primary Examiner—Ernest G. Therkorn
Attorney, Agent, or Firm—Hill, Van Santen, Steadman, Chiara & Simpson

[57] ABSTRACT

The invention relates to a method and apparatus for the purification of contaminated or sewage water. From a presettling basin, if needed, sewage water is conducted through a filter system in a continuous flow fashion such that the water does not settle in the filter system and is discharged from the filter system for use without need for further purification treatment. The filter system is closed to atmosphere and comprises an upstream ascending pipe which receives the water from the basin and passes the water directly into a filter body container. The ascending pipe is filled with a series of packings and materials for acid-neutralization, biological purification, filtration, and/or adsorption arranged in a series of layers. Adjacent the lower end of the ascending pipe is an air injection means which causes the water to be mixed with oxygen under pressure being dispersed in a finely atomized fashion from a plurality of nozzles. In the filter body container, the water passes through a series of filtration surfaces, such as sieves and porous synthetics, for biological and mechanical purification.

43 Claims, 9 Drawing Figures

METHOD AND DEVICE FOR PURIFYING SEWAGE

The invention relates to a method and apparatus for purifying industrial and/or domestic sewage upon employment of a filter system, multi-stage if necessary, to which the sewage to be purified is supplied after a mechanical prepurification and/or presettling.

Various processes and methods have become known for the purification of contaminated water, whether as effluent from households (domestic sewage) or in the broadest sense of the word by households (domestic sewage) or, respectively, water contaminated by industrial plants (industrial sewage). These processes and methods can essentially be comprised in three groups, namely, the mechanical, chemical and biological sewage purifications.

In mechanical sewage purification, essentially every mechanical separation of substances carried along in water, including suspended matter, is done with barriers, i.e. a purification of the water via screening systems, sand catcher systems up to and including purification of water in filter systems, in which the suspended matter is retained. Dissolved and colloidal components of the sewage cannot be removed by means of this type of purification.

In a chemical sewage purification, it is a matter of a neutralization or flocculation process in such manner that, for example, acidic sewage is neutralized with lime and alkaline sewage is neutralized with hydrochloric or sulfuric acid. The solids which are thereby precipitated are then removed in a succeeding mechanical settling. Colloidal substances, too, can be removed by means of this process.

Biological sewage purification serves for the removal of dissolved organic substances. Thereby, biological purification most strongly corresponds to the natural self-purification in bodies or water, which, however, can no longer handle today's great amounts of contaminants and which leads to a depletion of dissolved oxygen in the bodies of water.

It is also known to combine the purification processes outlined above in a sewage purification system, namely, to employ them in succession. Hereby, for example, in large-scale systems, the sewage is first subjected for presettling to a mechanical purification in settling basins, sand capturers or similar systems and is then fully biologically purified in clarification basins or is biologically purified with the so-called trickling filter process before it is introduced into the normal water economy, for example, into natural water courses.

The dimensions for such known sewage systems are becoming increasingly overwhelming due to the very great sewage amounts which are constantly increasing because of the rising standard of living which must be purified. The capacity of sand captures, settling basins (for mechanical purification) and, in particular, of trickling filter systems, sewage ponds, etc. (biological purification) is very often no longer sufficient soon after they are placed in operation, as a result of the high retention time generally required in the traditional purification methods. An overload, leads to faulty purification, i.e. the water is often delivered into a natural water body before the allowable residual contamination values which are prescribed per se can be achieved by means of the purification. Thus, systems are now in operation which, because of the long retention time of the water required by there inherent settling system, deliver the conditioned overload of the water to free water courses with a biological oxygen need, BON, load of 50 mg/l and far beyond (in place of a preferred 20). This, however, means that the rivers accepting the sewage are very quickly depleted of oxygen and, thus, all life dies off in the rivers.

At present, it is indeed possible to achieve decomposition outputs up to 95% and beyond with regard to the BON in domestic sewage and in mixed sewage with conventional processes (mechanical-biological, mechanical-physical). A new parameter CON (chemical oxygen need), however, is the standard for the new sewage emission laws in the Federal Republic of Germany and in most European and transoceanic countries.

In industrial sewage and mixed sewage (chemical-textile-wood pulp-leather-pharmaceutical) one can only achieve decomposition values with reference to CON parameters of 50% or slightly beyond with the conventional mechanical-biological or physical processes known up to now.

In these systems, only the biologically easily degradable organic substances can be decomposed. The biologically hard to degrade organic substances flow through these systems without decomposition and lead to a dangerous pollution of large water courses and of the oceans which is perilous to humanity. Thus, large rivers are today clogged with 60% refractory substances (a substance which cannot be biologically degraded or is difficult to biologically degrade).

Recycling sewage water i.e. a re-introduction of the water purified per se into the fabrication process of an industrial plant or, processing of drinking water in a domestic sewage system is not possible without the employment of special processes or, respectively, a longer influence of activated carbon for the removal of the residual pollution. Such processes, however, are uneconomical and expensive since the activated carbon must be regularly replaced or, respectively, reactivated. Therefore, these processes are not employed despite the danger of total pollution, even in the face of official protests.

With the method for the purification of sewage according to the present invention, a method which is of a completely new type is specified which purifies even the most highly contaminated water in a shorter time than has ever been achieved in a simple pass-through process. As in known processes, filters are likewise provided to which the sewage is supplied after a mechanical pre-purification and/or presettling, for example, in a conventional settling or sand capturing system.

The object of the invention is to specify a method in which the advantages of the three purification types cited above are united in a pure pass-through operation, whereby traversal time or, respectively, decomposition time of the contamination values of the water to be purified is not to be greater than in simple filter systems for mechanical purification despite the desired biological and biochemical purification.

This object is achieved with a method according to the invention in that, after the pre-purification/presettling, the sewage to be purified is enriched and permeated with atmospheric air, preferably under pressure, in a continuous flow process in a closed piping system. The introduction of air is carried out in the lower range of an ascending pipe, the so-called coupling reactor, which leads to a upper side of the filter and is at least partially filled with packing which is suitable for neutralization, biological purification, catalytic oxidation and/or adsorption. The water to be purified which is thus permeated with air subsequently conducted to a plurality of filters in the form of self-contained filter containers, which plurality corresponds to the degree of contamination. Each filter contains materials for biological purification as well as for catalytic oxidation, for biofiltration and for the adsorption in addition to sieving devices and similar packing agents serving for the mechanical purification of the water. The introduction of air is repeated after individual stages of the system, preferably after the water to be purified issues from the individual filter body or, respectively, filter bodies.

It is technologically possible to eliminate the total load of organic load media (organic substances which are easy and difficult to biologically decompose) from all sewage, if necessary in one stage (coupling reactor and combined filter) by means of the present invention.

In all methods known up to now (conventional methods and continuing methods) at least 5 or more stages are required for this process.

In the revealed method, a system-wise neutralization is carried out without the need of special devices and the continuous introduction of neutralizing media.

A separate sludge treatment is necessary in all conventional and continuing processes.

In the revealed method, no special sludge treatment is required in most industrial sewage, since the sludge which is situated in the back-wash water is completely insignificant.

Thereby, the individual materials for the mechanical purification, the packing for the biological or, respectively, biochemical purification are situated in a series of short stretches during to the passthrough path of the water through the system, so that the various purification types are continuously repeated.

Thereby, according to another feature of the invention, lumpy limestone and/or brown coal, or respectively, blast furnace slags are introduced at least over a specific length in the ascending pipe (coupling reactor) to the upper side of the first filter. These materials have shown themselves to be suited particularly for a neutralization of the pH value of the water to be purified. Beyond that, packing of metal, namely particularly precious metal but also of iron or iron ore, nonferrous metal or alloys of the above metals, as well as packing of synthetics, minerals, etc. are provided in the ascending pipe and also in the filter where—a biological turf is very quickly formed, particularly on hydracarbon (non-activated, fine-grained anthracite coal 1-5 mm) and on the blast furnace slags, which in turn takes care of the biological decomposition of the contaminant load of the water to be purified. Thereby, the employment of the different substances effects a neutralization, a cold oxidation, and biochemical changes.

According to the invention, sewage can be purified with oxygen-containing air. Thereby, pure oxygen is not exclusively required according to the method according to the invention, as is sometimes the case in known biological purification processes. On the contrary, it has become evident that atmospheric air is completely sufficient for the purpose of the oxygen enrichment of the sewage insofar as it is introduced into the water with a certain excess pressure in a closed piping system. In order to achieve a thorough intermixing between water and air in this introduction of air (air injection) and, on the other hand, to make sure that the air does not immediately separate again, this air injection is undertaken at the bottom of an ascending pipe, namely, via a plurality of nozzles via which the air streaming in is uniformly introduced into the water flowing past with somewhat greater pressure than the water pressure. Thereby, the length of the coupling reactor (at least 2 m, preferably, however, 5 to 5 m) guarantees that all air bubbles are completely absorbed by the water, so that air bubbles are no longer formed in the upper bend.

The introduction of air into a pipe in a closed conduit which carries sewage is a unique feature of the present invention. Although air or pure oxygen has been previously introduced on occasion in sewage systems, this always occurs in the framework of spraying systems or also by means of the introduction of the oxygen in a large basin or into containers, whereby the air or, oxygen, is introduced from below and bubbles through water.

Air injection devices immediately below the surface of the water in open sewage basis are likewise known. These systems, however, have the disadvantage that only small amounts of the introduced air, particularly of the introduced oxygen, can respectively be absorbed by the water, so that large losses both of oxygen as well as of a pump output must be accepted for the introduction of the oxygen or, respectively, of the air.

According to a further feature of the present invention, the air introduction is regularly repeated in the course of the pass-through process, whereby, as a ducting between various stages of the system is completely possible permitting economy. In any case, it is preferred that the air be added to the water via a plurality of nozzles and distributed as finely as possible in order to achieve a thorough intermixing between the water to be purified and the air bubbles.

The sewage enriched with air in that manner is then supplied to a filter or, respectively, to a filter system, according to the invention, whereby each filter, in addition to sieving devices and similar devices for the mechanical purification of the water, also contains sections or, respectively, materials for biological purification, for example, trickling filters. As already mentioned above, it is an essential partial feature according to the invention that various purification types, i.e., particularly the mechanical, the biological and the adsorbing purification of the water respectively ensue closely interconnected with one another.

Thereby, according to the present invention there respectively occurs practically in every individual stage of the decomposition system with more or less preferential treatment of individual partial features 1. a neutralization,
2. a blowing-out or stripping-out,
3. a catalytic oxidation,
4. a biological or biochemical decomposition process via micro-organisms and daughter organisms (enzymes) which are present or cultured,
5. a filtration and biofiltration (mixed filtration upon addition of synthetic granulates),
6. a general adsorption and
7. An adsorption upon employment of activated carbon.

By so doing, the high breakdown values rendered possible in extremely short flow-through times with an apparatus according to the invention. Moreover, the biological purification may be established within two hours immediately after sewage enters the system in contrast to the much longer times taken with conventional systems.

A system according to the invention can be switched off for times which are as long as desired and can be placed in operation again without having the total purification process being disrupted in any manner whatsoever.

Even after interruptions of weeks or months, no disruptions of any kind occur in the purification process. A back-washing is to be recommended only before placing the system in operation.

Amounts and flash loads cannot endanger the breakdown process.

In particular, this is also of particular significance for transportable purification systems, for which the present the invention is particularly suited. Hereby, the use of coal in the individual filter stages plays a particular role, since activated carbon is not employed for the purpose of biological purification, but rather, first, a simple hydracarbon, preferably fine-grained carbon in an appropriate granulation. This fine-grained hydrocarbon together with the sewage enriched with oxygen generates a biological turf in approximately two hours in the areas of the packings in the ascending pipe and in the filters, which biological turf renders possible a biological purification and which is co-responsible for a rapid elimination also of the colloidal components of the sewage.

Because of the said closed construction of the system with the continuous flow-through of water, a complete sewage purification is rendered possible without any kind of environmental contamination. In fact, no kind of emission of harmful substances or even only of odorous substances occurs when, as is possible within the framework of the invention, the air which, under certain conditions, emerges from individual containers via valves or emerges under control is collected and reintroduced to the purification process or, if necessary, is also separately conducted through an air filter.

DESCRIPTION OF THE PREFERRED EMBODIMENTS

Figure 1:
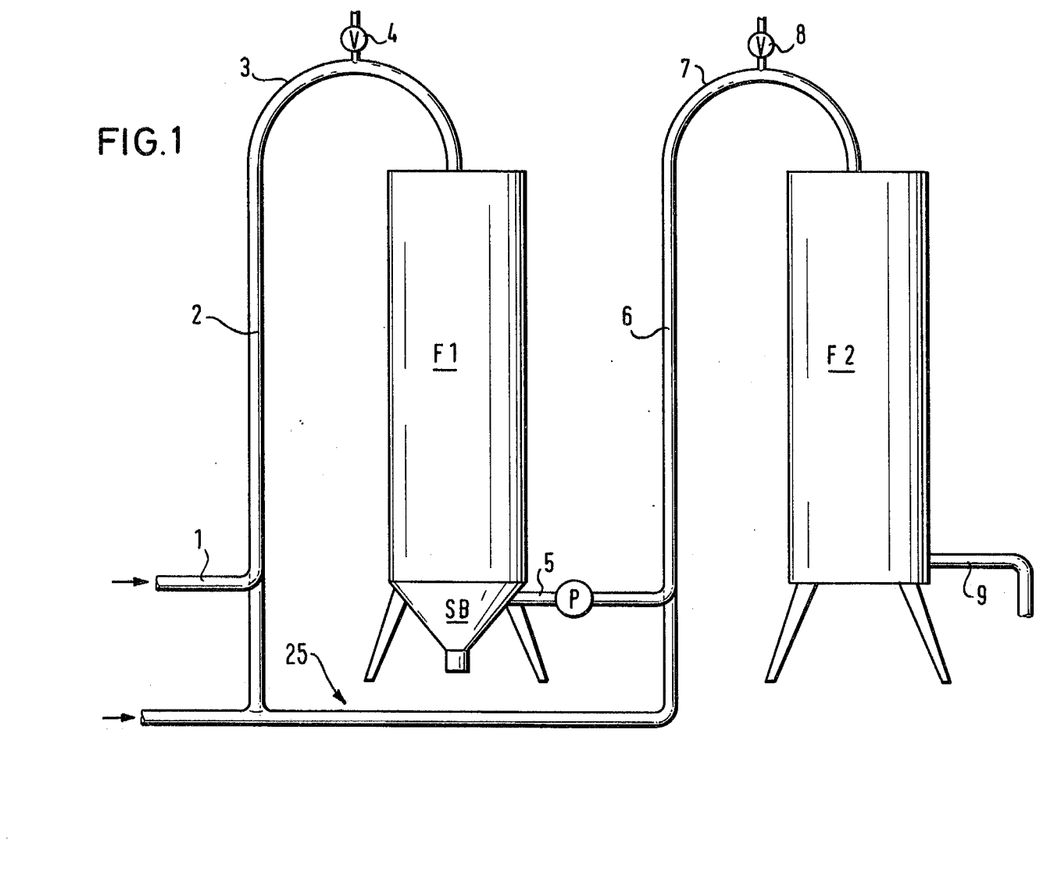
FIG. 1 is a schematic side elevational view of a purification system apparatus according to the present invention.

A basic construction of an apparatus for the implementation of the present invention is a general diagram of illustrated with a total system shown in FIG. 1. The FIG. 1, sewage water is first delivered for mechanical presettling into a settling basin (not shown) from which it arrives in an over-flow through a pipe 1 into an ascending pipe 2, which comprises a coupling reactor stage. A top elbow portion 3 of the coupling reactor contains a valve-perated vent or suction branch 4 for removing some water and/or exhausting air bubbles which could, under certain conditions, form at this highest point of the ascending pipe.

The sewage is permeated with air in the ascending pipe 2 by means of air injection system, described further below, comprising a feed conduit 25. (air injection). Thereby, the introduction air injection nozzles which have proved advantageous have discharge grids with approximately 20 through 100 pores per $cm^2$. The air is preferably finely atomized, for example, through 1000 nozzle openings. The air is introduced under a pressure which lies approximately 10% higher than the pressure to which the water to be purified is subjected to at the bottom elbow of the pipe 2. If, for example, the water to be purified is supplied at this location with a pressure of 2 atmospheres, then the air to be injected should be pressed into the water via the nozzle system with an approximate pressure of 2.2 atmospheres. Such a pressure differential appears necessary in order to distribute a sufficient amount of air in the sewage and at the same time to prevent the formation of larger air bubbles which could occur if the air were introduced with too great a pressure.

The sewage permeated and enriched by air then rises toward the top of the coupling reactor 4 because of the excess pressure. According to the invention, the ascending pipe 2 is provided with granular matter for neutralization, i.e. for the stabilization to a netural pH value, for catalytic oxidation (cold oxidation), and, if needed, with packings for biological or, biochemical purification of the sewage. This construction will be explained in detail below.

The sewage already pre-purified and strongly permeated with air in the coupling reactor is then supplied through pipe portion 3 to a first filter body F1. The sewage then streams, i.e. trickles and flows, through the filter F1, whereby the substances formed by means of the biological and biochemical purification as well as foreign bodies which are still present are filtered out and precipitated. For this purpose, a waste tank SB is provided, if necessary, at the bottom.

Possible constructions for the filter body F1 will be described below.

The already greatly purified water is then removed at the bottom of the filter and F1 preferably immediately below the water surface in the waste tank, and may again supplied via a pump P through a connection pipe 5 into a second ascending pipe means 6, forming a second coupling reactor. The second coupling reactor is formed with an upper elbow section 7 and vent means 8 in the manner of the first coupling reactor.

Atmospheric air is again introduced into the ascending pipe 5 under pressure and the water is passed into the top of a second filter body F2, having a possible construction to be described below.

The purified water is removed at the bottom of the filter F2 via a pipe 9 and where it may, for example, be re-introduced into a fabrication process as part of a recycling system.

The exhaust air emerging from the filters may be recycled back to first coupling reactor for wet washing thereof.

Figure 2:
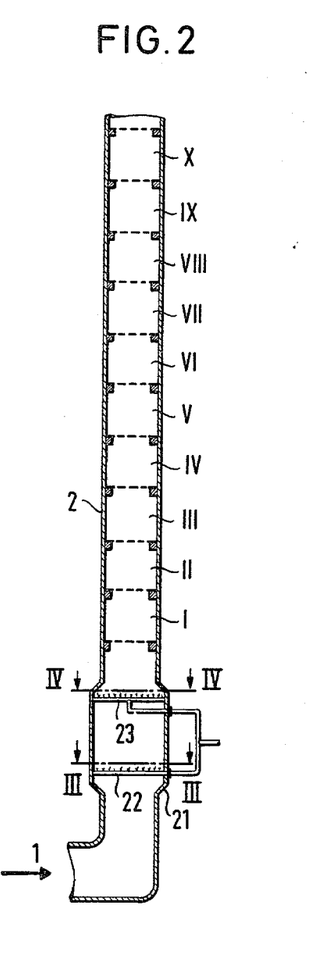
FIG. 2 is a schematic cross-sectional side elevational view of the ascending pipe in FIG. 1.

FIG. 2 shows a cross-section of an ascending pipe 2.

The sewage to be purified is supplied in the horizontal supply pipe 1, as shown in FIG. 1, and is then first subjected to air injection in the lower range 21 of the coupling reactor. For this purpose, according to the embodiment according to FIG. 2, this coupling reactor pipe is somewhat expanded in the lower range. Nozzle means 22 and 23 are arranged in this expansion, via which the air to be injected is supplied when the sewage streams past.

Various configurations of nozzle systems with which air can be pressed into water streaming past may be utilized. Air injection systems can be advantageously employed which correspond in construction, for example, to a simple showerhead.

Figure 3:
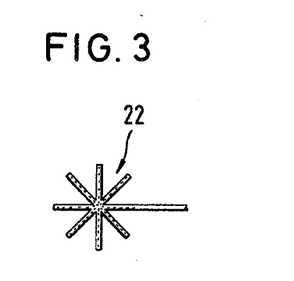
FIG. 3 is a plan view of an air injection nozzle in the ascending pipe.
Figure 4:
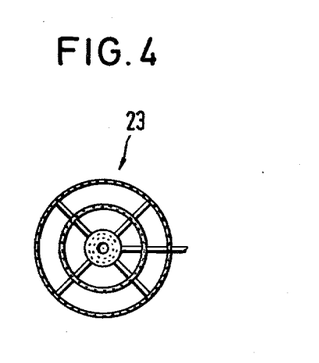
FIG. 4 is a plan view of a further air injection nozzle in the ascending pipe.

Air injection devices, illustrated for example in FIGS. 3 and 4, are particularly advantageous, since, in this case, the sewage to be permeated with air itself comes relatively closely into the range of the individual nozzles upon streaming around the conduction system. Thereby, for the purposes of the invention, approximately 10 through 100 nozzles per $cm^2$ pass-through cross section are to be provided in order to achieve the necessary, high air enrichment of the sewage with certainty.

Thereby, as is also shown in FIG. 2, it is particularly advantageous to arrange two or more air injection nozzles behind one another, since the individual air distribution lines cannot be arranged as close to one another as may be desired in consideration of the fact that the water which is indeed greatly contaminated must pass freely through the injection system.

However, for various purposes, one injection system is also completely sufficient. In other cases, more injection nozzle beds can also be arranged in the lower range of the coupling reactor 4. In this regard, the illustration according to FIG. 2 is to be evaluated only as an example.

The ascending pipe itself is subdivided into a plurality of pass-through chambers I-X with a multitude of appropriate open-meshed pass-through sieves. The pass-through chambers are provided in accordance with the invention with materials which are suited for neutralization, biological or biochemical purification, cold oxidation and/or adsorption. Thereby, in the sample embodiment, the length of the pipe is subdivided into a total of ten pass-through chambers of which the lowest is more or less filled with limestone, the next with blast furnace slag, the third with coal, the fourth with brown coal slag, etc.

Thereby, particularly the limestone as well as the blast furnace slag and the brown coal slag serve for the neutralization of the sewage. This neutralization is essentially achieved in the manner of a cold oxidation.

In the treatment of sewage with extreme pH values, it may be desirable to conduct the sewage through a pre-neutralization basin over limestone, blast furnace slag and/or brown coal slag as well as hydrocarbon prior to air entrainment in the first coupling reactor, in order to initiate a first neutralization which then renders possible a more rapid breakdown of the pH value via a cold oxidation by means of the introduction of the finely-distributed oxygen.

Although, in the same embodiment according to FIG. 2, different packings or, respectively, materials occur in the ascending pipe chambers, this does not mean that a particular sequence is needed or that such purification materials must occur there. Depending on the type of sewage to be treated, individual minerals or packing types may be omitted. In particular, it is also to be recommended that certain substances be repeatedly employed at various locations of the ascending pipe. Thus, for example, it is expedient in the case of acidic sewage, to first repeat the cold oxidation stages before the sewage is conducted over packings consisting of argillaceous minerals or metal and then conducted through diatomaceous earth or limestone trickling.

For neutralization, packings, for example, in the form of balls can be employed which consist of argillaceous minerals/corundum and limestone/blast furnace slag, brown coal slag and quartz.

In addition to the above-mentioned substances, layers in the acending pipe consisting of packings comprised of synthetics, for example, nylon, PVC or polyamide bodies can be employed particularly in the upper range of the ascending pipe, by which a significant breakdown of the sewage has already ensued, for a biological purification.

The individual materials and, particularly the materials to be employed for the neutralization are slightly reduced in volume during the course of the purification process, so that it is to be recommended to replace or to replenish purification materials in the ascending pipe itself in a time interval of, for example, one to two years.

Figure 5:
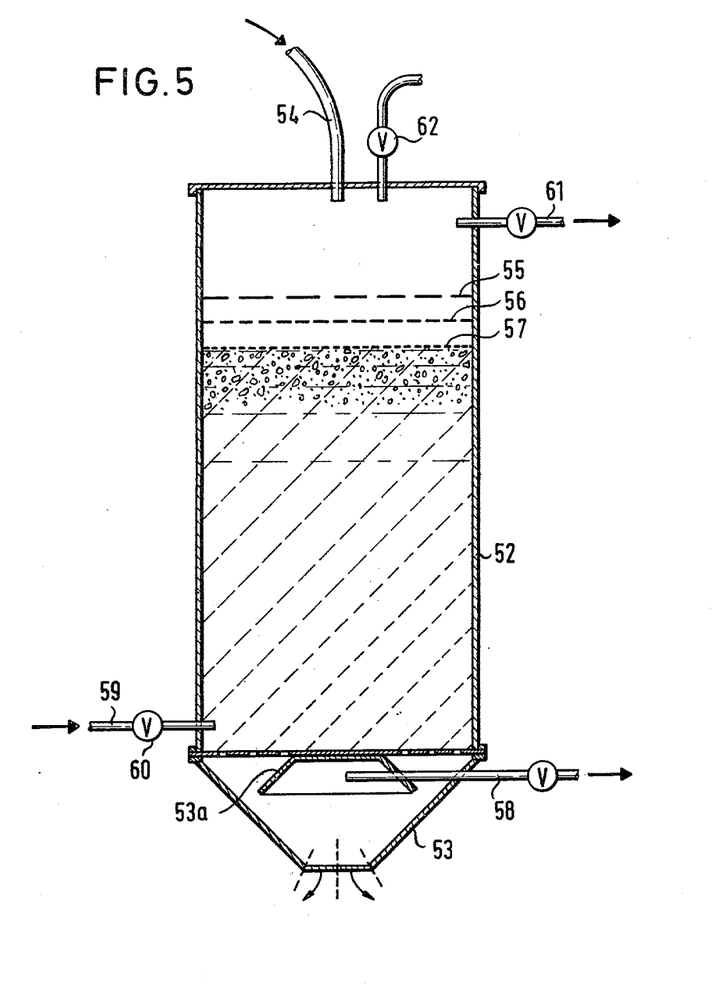
FIG. 5 is a cross-sectional side elevational view of a filter body tank useable in a purification system apparatus according to the present invention.

The following discussion is in reference to possible constructions of filter body tank constructions which may be employed in the present purification system invention. With reference to FIG. 5, there is shown a simple filter body construction such as can be employed as the first, and, upon certain conditions, also as the only filter stage in a device according to the invention.

This filter body essentially comprises two container parts 52 and 53, whereby the container part 52 represents an actual filter section, whereas the container 53 assumes a function of the sludge collecting basin.

Liquid sewage, arriving greatly purified via the ascending line, is supplied via the supply line 54. The liquid first is passed through three sieves, namely a perforated sieve 55, a coarse sieve 56 and a fine sieve 57, arranged in the top of the filter body. Porous tiles which are of any desired material composition with sufficient pore opening may be laid upon the sieves. The sieves have pore openings or are in the form of wire mesh screens.

A lower limiting wall of the container part 52 is provided with perforations through which sludge substances being precipitated out in the filter body can arrive in the sludge collecting container 53. The sludge can be removed from the container 53 in a manner known per se, for example, by means of opening out the bottom walls or by being suctioned off.

The purified water is removed via a discharge conduit 58 in communication with a pump such as a rotary piston pump. The discharge conduit 58 is arranged in such manner that it removes the water in the sludge container 53 as close as possible to the surface of the water collecting in the basin. It is thereby assured that sludge residues will not pass through the discharge conduit 58. In order to place the water removal in an area in which the water is as free of turbulence as possible, a flashing or housing 53a is provided which shields the area of the water removal from water entering from above.

The filter or, respectively, the collecting container can be backwashed. To this end, water under pressure is supplied via a supply pipe 59 which is provided with a sluice valve 60. This water under pressure streams through the filter container from the bottom toward the top and thereby cleans the packings and also the individual sieves. It leaves the filter container via an outlet pipe 61. During the back-washing, the supply and discharge lines 54 and 58 are respectively closed and the back-wash flow lines 59 and 61 are opened, thus, the precipitated material is rinsed out.

A back-washing of the filter can be carried out during the purification process itself without a negative influence on the purification process.

A pressure relief valve means 62 is provided in the upper wall or cover of the container, which sees to it that an unallowably high excess pressure cannot be built up which may cause blockage of the discharge flow and/or the individual sieves. Air collected in the ascending pipe which collects below the cover can also be removed via this valve 28. This released air can again be added to the sewage at a different location as injected air, whereby, as needed, the excess pressure forming in the container can be directly exploited.

Figure 6:
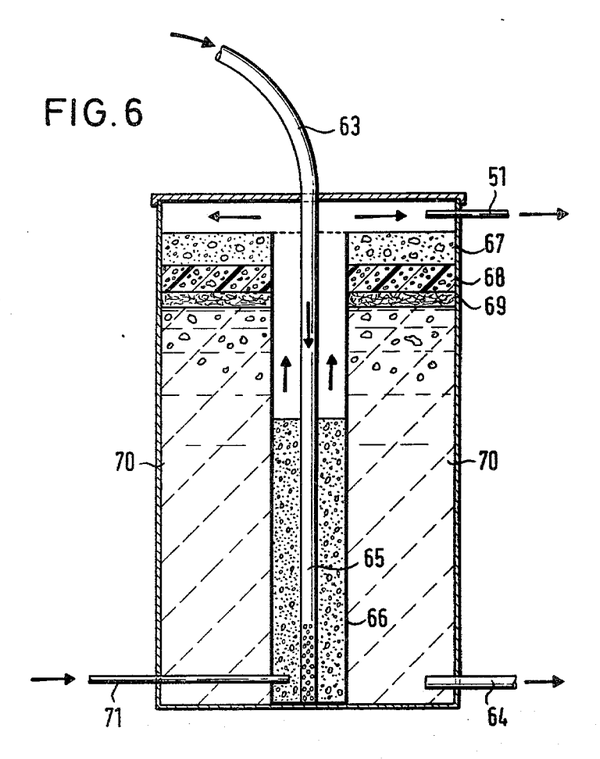
FIG. 6 is a cross-sectional side elevational view of a further filter body tank useable in a purification system apparatus according to the present invention.

Another filter body construction, shown in FIG. 6, useable as part of the present invention, whether alone or in conjunction with a further filter body, has a concentric double filter arrangement.

The filter body exhibits a supply line 63 via which the sewage correspondingly pre-purified in the ascending pipe is supplied. A discharge conduit 64 is situated in the lower portion and discharges the liquid from the filter either to a next filter unit or directly for use.

Sewage water to be purified is first conducted via an interior pipe 65 to the bottom of a concentric interior pipe section 66. At the bottom, it enters through the corresponding bore-holes into the interior pipe 66 which is filled with particles of medium or fine grained size. The water rises toward the top of the filter body tank through this body of particles and arrives in a starting filter space above three sieve layers 67, 68 and 69.

The sieve layer 67, similar to the sieve arrangement of FIG. 5, is again provided with the largest pass-through openings. This layer may be comprised, for example, of lava tuff, of synthetic shavings or also of lumpy, fine-pored synthetic formed parts. The layer 68 has finer openings and preferably consists of hard foam rubber. The layer 68 can also be formed of foam rubber shavings or of foam rubber form parts which are introduced between two holding layers. Finally, layer 69 is fine-pored synthetic, for example, a porous fleece, glass wool, or something similar.

The main filter filling in the filter body container 70, finally, consists of a mixture of hydrocarbon, solid particles and quartz with a grain size which lies between 0.5 and 5 mm, preferably between 1 and 2 mm.

In order to render possible a back-washing, a water intake 71 and a discharge pipe 51 are provided. The filter can be regularly back-washed via these connections. Practice has shown that a cleansing particularly of the sieve layers 67, 68 and 69 is produced with approximately 1% of the amount of water which passed through since the last back-washing. The back-washing water loaded with contaminants is either supplied to a settling basin or out to a location for renewed purification in the same system.

Figure 7:
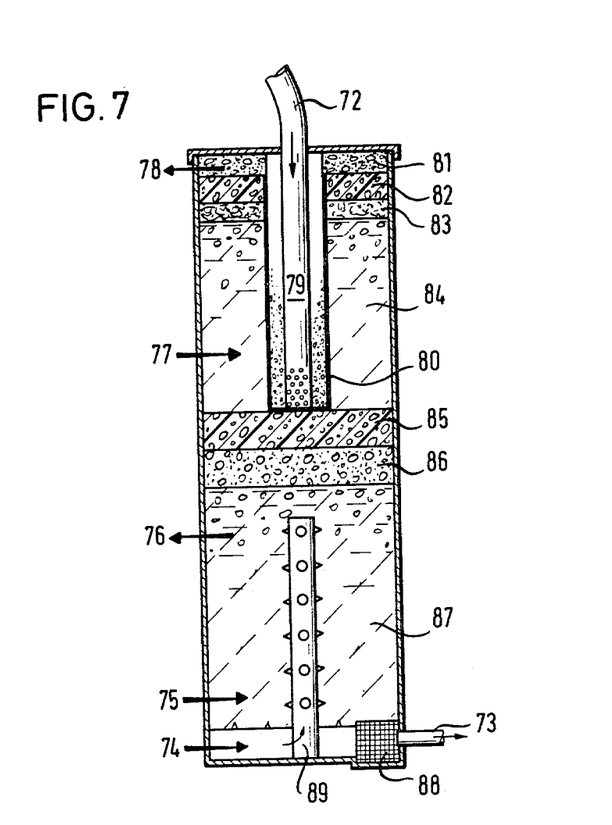
FIG. 7 is a cross-sectional side elevational view of another filter body tank useable in a purification system apparatus according to the present invention.

FIG. 7 shows a compound filter body which, given an appropriately low contaminant load, can also be employed as the only purification stage after the ascending pipe line stage.

The sewage strongly permeated with atmospheric air coming from the ascending line is supplied to the double filter illustrated in FIG. 7 via an introduction line 72. The finally purified water is discharged via a discharge line 73 and can be introduced into the normal water economy or, upon employment of an system for the purification of industrial sewage, can be again introduced into a fabrication process in the manner of recycling. For reasons of clarity, not all supply and discharge connections which are of significance for the operation of the filter are reproduced in physical representation, but rather in the form of arrows. Arrows 74 through 78, respectively represent connections for superheated steam (connection 74) or, rinse water (connections 75 through 78) for the back-washing of the two filter units. These connections of the filter container which are necessary for the maintenance of the operation will be discussed below.

The water to be purified an interior introduction pipe 79 and then rises toward the top in an interior pipe 80 which concentrically surrounds the introduction pipe. This concentric interior pipe 80 is filled with lumpy coal material, i.e., hydrocarbon, as well as with natural stones (scree) and lava tuff pieces. By means of the rise of the water enriched with oxygen, an extremely effective biological turf is very quickly formed on the scree and on the lave tuff which, leads to a good enzyme formation.

The water rises toward the top and is distributed over the upper surface of the filter. Again, in typical fashion three sieve layers 81, 82 and 83 are provided, whereby a first sieve layer 81 represents the largest sieve and is formed, in general, of lava tuff rocks.

A layer 82 consisting of porous synthetic, for example, hard foam rubber or a mesh of polyamide fibers, polyacrylonitrile, cellulose acetate, polyester or other synthetic fibers is provided below the upper layer. This second layer 82 represents a sieve with a medium sieve opening.

The lowest of the three layers, namely, layer 83, is formed of a porous fleece with relatively fine openings, so that the water passing through the three layers is practically freed of suspended particles. Glass wool or a porous hard foam rubber with correspondingly fine openings can also be provided at this location instead of porous fleece.

A filter layer 84 to be passed through following the sieve layers consists of a mixture of granular matter and, namely, preferably of coal in a piece size from 1 to 2 mm diameter, silica sand of the same size as well as gravel (scree) and/or of synthetic granulates of the same size for a biofiltration. A biological breakdown then again occurs in this area of the filter, whereby a further mechanical filtering occurs in conjunction with the biological breakdown by means of the employment of the silica sand and the scree.

The water then flows through a synthetic sieve 85 into the second part of the double filter container. This synthetic sieve is again formed of polyamide fibers. Beneath sieve 85 is a layer 86 consisting of non-acitve hydracrabon. Finally, a lower space 87 is filled with activated carbon which then removes the very last milligram of the contaminant load in a relatively short contact time (3 to 5 minutes).

The purified water then leaves the double filter container through a microfilter sieve 88 consisting of polyamide or other synthetic fibers. The materials described above are respectively incorporated spatially in defined layers in the filter container according to the invention, whereby it is provided with the assistnace of sieve meshes that the materials do not intermix too strongly, but rather essentially remain at the predetermined, specific section of the filter body tank. The spatial fixing is also necessary and advantageous because the filter containers according to the invention are back-washed from time to time in order to fully obtain or reconstitute their functionability. Two water flow lines 75 and 76 are provided for the back-washing of the lower area and corresponding flow lines 77 and 78 are provided for the upper area. During back-washing, water under pressure is respectively introduced via the intake lines 75 and 77, which water is pressed into the individual filter areas toward the top and, thereby rinses out the deposited dirt which is then discharged through the discharge pipes 76 and 78.

Practice has shown that a back-washing of this filter can be successfully carried out with approximately 1% of the amount of water conducted through the filter in the purification process. Water employed for the back-washing becomes particularly highly contaminated and can then be re-supplied to a settling basin or recycled back into the purification system itself. Suspended matter contained in the back-wash water is removed during recycling in the system and collects in the sludge collecting basin SB, shown in FIG. 1.

In the double filter container described above shown in FIG. 7, activated carbon provided in the lower part of the filter, must be regenerated from time to time. To this end, a line jet system supplies superheated steam into the filter body via a connection line 74. This superheated discharges through a tube 89 having jet nozzle apertures into the area of the carbon 87 to be activated and renders possible the reactivation of this carbon directly in the filter area, i.e. without the carbon having to be removed from the filter. The superheated steam itself can then be discharged via the discharge line 76, just like the back-wash water. The regeneration process by means of the introduction of superheated steam and hot air renders possible a thermal partial regeneration of the activated carbon and, at the same time, a thermal activation or regeneration of the general adsorption media (high-sintered special coke, blast furnace slag and argillaceous minerals).

Figure 8:
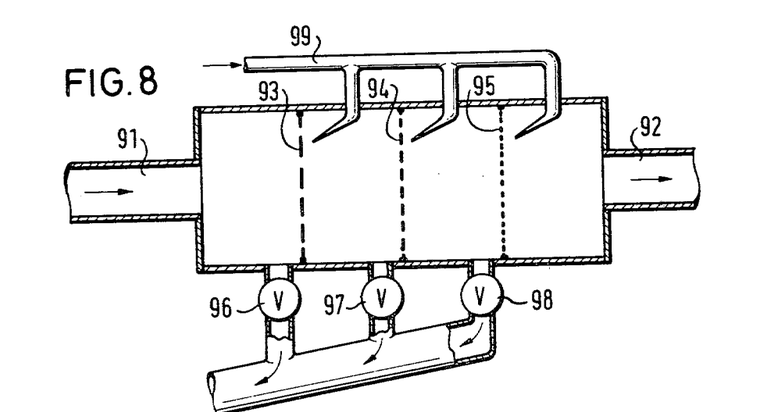
FIG. 8 is a cross-sectional side elevational view of a solids separator device useable in a purification system apparatus according to the present invention.

The sewage to be purified according to the method according to the invention should be as free as possible of lumpy solids, since these could negatively influence the flow of the water through the closed line and filter system, or respectively, would clog the entire system. In sewage in which such solids could arise, it is to be recommended to pre-connect a solids separator to the system. Such a solids separator, as can be employed in the framework of a system according to the invention, is shown in FIG. 8. The solids separator can be built in as a part of the system's collecting container, said collector or something similar or can be built in additionally as well. Given textile sewage, a slubs precipitator is required.

The solids separator shown in FIG. 8 has an intake pipe 91 via which the water charged with larger suspended substances arrives. This water is to be cleansed of these coarse substances carried therealong and is to be supplied to the purification system via an outlet pipe 92. To this end, it flows through three sieves 93, 94, 95 with their respective sieve openings diminishing in size in the direction of the flow. Since there is a danger that these sieves would be quickly clogged given water which contains a high degree of dirt, these sieves must be regularly cleaned. This may be done by means of the compressed air bursts presswater nozzles which are regularly supplied with pressure media via a distributor system 99. Outlet valves 96, 97 and 98 are simultaneously opened when residue is discharged. The outlet lines lead, for example, into a sludge basin.

Figure 9:
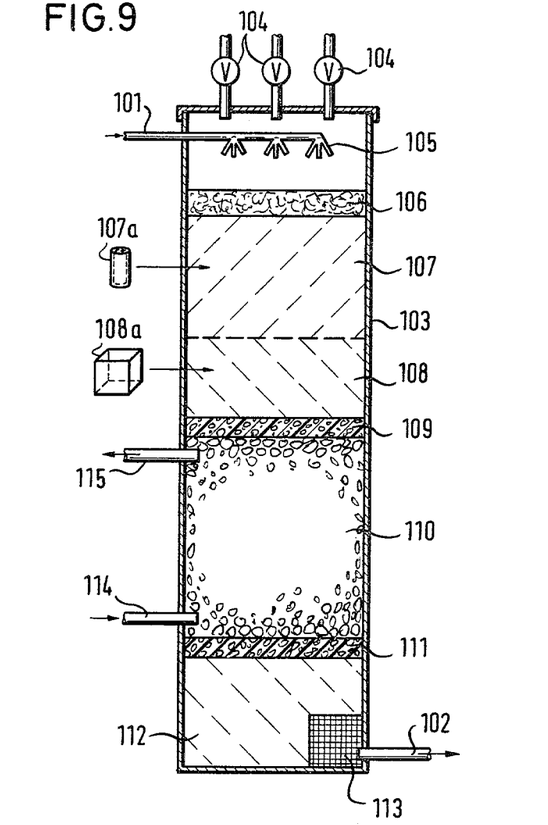
FIG. 9 is a cross-sectional side elevational view of a still further filter body tank useable in a purification system apparatus according to the present invention.

FIG. 9 shows a further combined filter body container having trickling filter properties two stages, whereby the trickling filter function is achieved in the upper half stage.

Liquid sewage to be purified enters the filter tank via an intake pipe 101 and leaves this container correspondingly purified through a discharge pipe 102. In the case of this combined trickling filter/filter container 103, as with the above filter body tanks, it is closed volume. Since one must reckon with gas formation specifically in "trickling filter purification" and the absorbed atmospheric air is released during trickling, pressure relief valves 104 are provided via which these gases can be removed into an appropriate reservoir or, respectively, can be recycled into the purification process.

In contrast to the other filters, the water to be purified is introduced in a wide dispersion by means of sets of distributors nozzles 105. This dispersion is strengthened by means of a porous layer 106 which at the same time serves as a dam layer for heat emission. A porous fleece consisting of synthetic fiber weave or a layer consisting of glass wool is particularly suited at this location.

The water then trickles through a first part 107 of the trickle filter having hollow bodies 107a consisting of synthetic or more or less porous ceramic and a second part 108 filled with packings 108a.

In a lower part 110 of this filter container pieces consisting of coal, blast furnace slag, scree, synthetic and/or silica sand are provided, whereby this part is held separate by means of an upper synthetic layer 109 and a lower hard rubber layer 111. This part of the filter is back-washable by means of intake 114 and discharge pipes 115, whereas the trickling filter part 107 and 108 may not be back-washed in order not to destroy biological turf forming on the trickle filters 87a and 88a.

Finally, mixed coal pieces, scree, fine-grained anthracite coal pieces, fine-grained blast furnace slag, fine-grained alpine material, fine-grained quartz, fine-grained cevilite and pumice are located at a lowest area 112, preferably in granulations 1–3 mm, in order to complete or, respectively, continue the combined purification.

The water purified by means of this combined filter must then yet pass through a fiber sieve 113 before it leaves the container.

The particular construction of the individual filters may be modified as a matter of design need for particular sewage purification applications on the basis of the above discussion without it being necessary to supplement the present application with further constructional details. It can be seen that a series of constructional variations can be conceived which optimize the basic idea of the invention of interlacing the mechanical and biological purification as far as possible and optimizing the biological purification by means of a timely and regular air injection in conjunction with the employment of hydrocarbon.

It is further within the contemplation of the invention that the pass-through introduction of the water to be purified and permeated with air into the individual filter body containers can be employed in the reverse direction from that shown herein, i.e. from the bottom toward the top.

The manner in which, for the purification of the sewage, air is introduced carbon is introduced in the purification system, whereby the aforementioned very rapid breakdown values are to be attained even given purely colloidally contaminated water, can also be varied in order to obtain proteins (enzymes) from the contaminated water. Enzymes may be simply filtered out during the sewage purification snd also filtered out during subsequent backwashing in special systems for the production of these enzymes. This occurs particularly with water which is suited for the production of the enzymes is supplied to a corresponding filter container according to the invention. Enzyme formation occurs with a filter body as was discussed on the basis of FIG. 9.

Although various minor modifications may be suggested by those versed in the art, it should be understood that I wish to embody within the scope of the patent warranted hereon all such modifications as reasonably and properly come within the scope of my contribution to the art.

I claim:

1. A method of passing sewage water through a filter system closed to atmosphere for purification of said water comprising:
   feeding said water through a pipe means having a portion thereof filled with packings for at least biological purification of said water,
   introducing oxygen under pressure into said pipe means for mixing with said water upstream of said packing portion,
   supplying said water from said pipe means directly to a filter body container wherein said water passes through a series of filtration means for at least mechanical and biological purification of said water, and
   passing said water through said filter system in a continuous flow fashion such that said water does not settle in said filter system.

2. The method of claim 1, wherein said sewage water enters said filter system from a presettling basin.

3. The method of claim 1, wherein said oxygen is in the form of air.

4. The method of claim 1, wherein said packing portion includes at least some materials for acid-neutralization of said water and wherein said oxygen is introduced in a finally distributed manner.

5. The method of claim 1, wherein said packing portion includes at least some materials for catalytic oxidation and adsorption.

6. The method of claim 1, wherein said packing portion includes carbon granules.

7. The method of claim 1, wherein said oxygen is introduced at spaced-apart locations in said pipe means and is discharged into said water through a plurality of individual nozzles affording a finely dispersed mixing of oxygen with said water.

8. The method of claim 1, wherein said water is discharged directly from said filter body container for use without requiring further purification treatment.

9. The method of claim 1, wherein said oxygen is introduced into said pipe means at a pressure approximately 10% higher than the water pressure where said oxygen is being introduced and said oxygen is introduced in a finally atomized fashion.

10. The method of claim 9, wherein said oxygen is in the form of air.

11. The method of claim 1, wherein said filtration means in said filter body container comprises an upstream stage having a plurality of sieve layers and an immediately downstream stage having means for at least biological purification of said water.

12. The method of claim 1, further comprising:
    discharging said water from said filter body container into a further pipe means having a further portion thereof filled with packings for at least biological purification of said water,
    introducing oxygen under pressure into said further pipe means for mixing with said water,
    feeding said water from said further pipe means directly to a further filter body container wherein said water passes through a further filtration means for at least mechanical and biological purification of said water, and
    passing said water from said further filter body container directly for use without further purification treatment.

13. A method of passing sewage water from a presettling basin through a filter system closed to atmosphere for purification of said water comprising:
    feeding said water into an ascending pipe means having a portion thereof filled with packings for at least biological purification of said water,
    introducing oxygen under pressure into said pipe means adjacent the lower end thereof for mixing with said water upstream of said packing portion,
    supplying said water from said pipe means directly to a filter body container wherein said water passes through a series of filtration means including sieve devices, packings for mechanical purification of said water, and materials for biological purification of said water,
    discharging said water from said filter body container directly into a further ascending pipe means having a further portion thereof filled with packings for at least biological purification of said water,
    introducing oxygen under pressure into said further pipe means for mixing with said water,
    supplying said water from said further pipe means directly to a further filter body container wherein said water passes through a series of further filtration means for at least mechanical and biological purification of said water, and
    passing said water through said filter system in a continuous flow fashion such that said water does not settle in said filter system.

14. Apparatus for purifying sewage water comprising:
    a filter system closed to atmosphere having a filter body container and a pipe means leading to said filter body container,
    means for feeding said water to said pipe means,
    said pipe means having a portion thereof filled with packings for at least biological purification of said water, injection means for introducing oxygen under pressure into said pipe means for mixture with said water upstream of said packing portion, said filter body container having a series of filtration surfaces for at least mechanical and biological purification of said water through which said water passes, means discharging said water directly from said filter system for use without need for further purification treatment, and means for passing said water through said filter system in a continuous flow fashion such that said water does not settle in said filter system.

15. The apparatus of claim 14, wherein said pipe means is an ascending pipe and said injection means is located adjacent the lower end of said ascending pipe.

16. The apparatus of claim 15, wherein said ascending pipe extends through a vertical height of at least three meters.

17. The apparatus of claim 14, wherein said packings include material for acid-neutralization.

18. The apparatus of claim 17, wherein said material for acid-neutralization of limestone.

19. The apparatus of claim 17, wherein said acid-neutralization material is blast furnace slag.

20. The apparatus of claim 17, wherein said acid-neutralization material is coal granules.

21. The apparatus of claim 17, wherein said acid-neutralization material comprises argillaceous minerals, granulated limestone, granulated blast furnace slag, granulated coal, and quartz.

22. The apparatus of claim 14, wherein said oxygen is in the form of air.

23. The apparatus of claim 14, wherein said injection means comprises a plurality of individual nozzles affording a finely dispersed mixing of oxygen with said water.

24. The apparatus of claim 23, wherein said plurality of individual nozzles is divided into two spaced-apart sets in said pipe means.

25. The apparatus of claim 14, wherein said injection means introduces said oxygen at a pressure approximately 10% higher than the water pressure adjacent said injection means in said pipe means and said injection means comprises a plurality of individual nozzles affording a finely dispersed mixing of oxygen with said water.

26. The apparatus of claim 25, wherein said oxygen is in the form of air.

27. The apparatus of claim 14, wherein said packings include iron for catalytic oxidation.

28. The apparatus of claim 14, wherein said packings include hydrocarbon, silica sand, and scree.

29. The apparatus of claim 14, wherein said filtration surfaces include glass, quartz, and argillaceous minerals for cold oxidation.

30. The apparatus of claim 14, wherein said filtration surfaces contain small bodies of synthetic plastic.

31. The apparatus of claim 14, wherein said filtration surfaces are in the form of plural layers, an upstream layer including a plurality of sieves in flow series with pore openings that diminish in area going from the upstreammost sieve to the downstreammost sieve and a downstream layer having means for at least biological purification of said water.

32. The apparatus of claim 31, wherein said downstream layer includes bodies of synthetic plastic.

33. The apparatus of claim 31, wherein said downstream layer contains porous rock and activated carbon.

34. The apparatus of claim 14, wherein said filtration surfaces are arranged in the form of first and second concentric filter stages, said first filter stage being surrounded by said second filter stage and receiving said water from said pipe means.

35. The apparatus of claim 34, further comprising means for directing said water axially of said first filter stage to one end of said filter body container for passage through said second filter stage.

36. The apparatus of claim 35, wherein said second filter stage comprises an upstream plurality of sieve layers and a downstream volume containing a mixture of hydrocarbon, scree, and quartz.

37. The apparatus of claim 14, wherein said pipe means is in the form of an ascending pipe having a release valve means adjacent the upper end thereof.

38. The apparatus of claim 14, further comprising means for back-washing said filtration surfaces.

39. The apparatus of claim 14, further comprising a solids separator device for removing course particles from said water during passage through said filter system.

40. The apparatus of claim 14, wherein said filter body container is provided with pressure relief means.

41. The apparatus of claim 14, wherein said filter system has a further pipe means and a further filter body container connected downstream in flow series relation with said filter body container, said further pipe means receiving said water from said filter body container and passing said water to said further filter body container, said further pipe means having further packings therein for at least biological purification of said water, further injection means for introducing oxygen under pressure into said further pipe means for mixing with said water upstream of said further packings, and said further filter body container having further filtration surfaces for at least mechanical and biological purification of said water.

42. The apparatus of claim 40, wherein said further pipe means is in the form of an ascending pipe and said further injection means is located adjacent the lower end of said ascending pipe.

43. Apparatus for purifying sewage water comprising:

a filter system closed to atmosphere including at least one filter container body and an ascending pipe extending for at least three meters in vertical height connected to said at least one filter body container, means supplying said water into said ascending pipe at the lower end thereof, said ascending pipe having a portion thereof filled with packings for at least biological purification of said water, injection means for introducing oxygen under pressure into said ascending pipe for mixing with said water upstream of said packing portion, said injection means located adjacent the lower end of said ascending pipe and comprising a plurality of individual discharge nozzles affording a finely dispersed discharge of oxygen into said ascending pipe, said at least one filter body having filtration surfaces for at least mechanical and biological purification of said water through which said water passes, means for passing said water through said filter system in a continuous flow fashion such that said water does not settle in said filter system, and means discharging said water directly from said filter system for use without need for further purification treatment.

* * * * *